United States Patent
Beaude et al.

(10) Patent No.: US 11,186,194 B2
(45) Date of Patent: Nov. 30, 2021

(54) CHARGING DEVICE, IN PARTICULAR FOR AN ELECTRIC VEHICLE

(71) Applicant: ELECTRICITE DE FRANCE, Paris (FR)

(72) Inventors: Olivier Beaude, Paris (FR); Bayram Kaddour, Massy (FR); Bertrand Augustin, Versailles (FR); Julien Pennec, Massy (FR)

(73) Assignee: ELECTRICITE DE FRANCE, Paris (FR)

( * ) Notice: Subject to any disclaimer, the term of this patent is extended or adjusted under 35 U.S.C. 154(b) by 281 days.

(21) Appl. No.: 16/468,524

(22) PCT Filed: Dec. 18, 2017

(86) PCT No.: PCT/EP2017/083375
§ 371 (c)(1),
(2) Date: Jun. 11, 2019

(87) PCT Pub. No.: WO2018/114842
PCT Pub. Date: Jun. 28, 2018

(65) Prior Publication Data
US 2019/0344680 A1    Nov. 14, 2019

(30) Foreign Application Priority Data
Dec. 19, 2016    (FR) ...................................... 16 62747

(51) Int. Cl.
*B60L 53/63*    (2019.01)
*G06N 20/00*    (2019.01)
(Continued)

(52) U.S. Cl.
CPC .............. *B60L 53/63* (2019.02); *G06N 20/00* (2019.01); *H02J 7/007* (2013.01); *B60L 53/14* (2019.02);
(Continued)

(58) Field of Classification Search
CPC .......... B60L 53/63; B60L 53/14; B60L 53/64; G06N 20/00; B60Y 2200/91;
(Continued)

(56) References Cited

U.S. PATENT DOCUMENTS 9,143,008 B2 *   9/2015   Aisu ................. H02J 13/00004
9,310,785 B2 *   4/2016   Otsuki .................... G05B 13/02
(Continued)

FOREIGN PATENT DOCUMENTS

FR         2 998 530 A1     5/2014

*Primary Examiner* — Nha T Nguyen
(74) *Attorney, Agent, or Firm* — Faegre Drinker Biddle & Reath LLP (57) ABSTRACT

A charging device, whose input is connected to an electricity point of delivery adapted to provide a maximum electric power and delivering regulated electric power as output, comprises an optimization module configured to construct a charging profile representative of a first charging power, and a regulation module having a first mode of operation wherein it regulates the electric power that is output in order to match it to the first charging power, and a second mode of operation wherein said it regulates the electric power that is output in order to match it to a second charging power, the regulation module being configured to switch from the first mode to the second mode in response to the satisfying of at least one condition defined on the basis of power consumption predictions for the other equipment items and on the basis of measured power consumption data for said other equipment items.

15 Claims, 3 Drawing Sheets

(51) Int. Cl.
  *H02J 7/00* (2006.01)
  *B60L 53/14* (2019.01)
  *B60L 53/64* (2019.01)
(52) U.S. Cl.
  CPC ........... *B60L 53/64* (2019.02); *B60Y 2200/91* (2013.01); *B60Y 2300/91* (2013.01)
(58) Field of Classification Search
  CPC . B60Y 2300/91; Y02T 90/12; Y02T 10/7072; Y02T 10/70; Y04S 10/126; Y02E 60/00; H02J 3/28; H02J 7/0071; H02J 7/007
  See application file for complete search history.

(56) References Cited

U.S. PATENT DOCUMENTS

| | | | |
|---|---|---|---|
| 9,623,762 B2* | 4/2017 | Park | B60L 11/185 |
| 2011/0043165 A1 | 2/2011 | Kinser et al. | |
| 2011/0221393 A1* | 9/2011 | Billmaier | B60L 53/65 |
| | | | 320/109 |
| 2012/0032636 A1* | 2/2012 | Bianco | B60L 53/22 |
| | | | 320/109 |
| 2012/0065792 A1* | 3/2012 | Yonezawa | H02J 3/14 |
| | | | 700/291 |
| 2012/0095612 A1 | 4/2012 | Rivers, Jr. et al. | |
| 2013/0076297 A1* | 3/2013 | Suyama | B60L 53/64 |
| | | | 320/103 |
| 2013/0103378 A1* | 4/2013 | Tinnakornsrisuphap | B60L 15/2045 |
| | | | 703/18 |
| 2014/0200724 A1 | 7/2014 | Sortomme | |
| 2014/0285001 A1* | 9/2014 | Murayama | B60L 58/15 |
| | | | 307/9.1 |
| 2014/0297209 A1* | 10/2014 | Dilly | H02J 13/00007 |
| | | | 702/61 |
| 2015/0155715 A1* | 6/2015 | Kobayashi | H02J 7/007 |
| | | | 307/24 |
| 2015/0298569 A1* | 10/2015 | Kosetsu | B60L 15/20 |
| | | | 320/155 |
| 2015/0326012 A1* | 11/2015 | Tsuchiya | B60L 15/2045 |
| | | | 307/20 |
| 2016/0257214 A1* | 9/2016 | Miftakhov | B60L 11/1844 |
| 2017/0036557 A1* | 2/2017 | Tsuchiya | H02J 7/007 |
| 2017/0036560 A1* | 2/2017 | Schuelke | B60L 11/1844 |

* cited by examiner

FIG. 3

CHARGING DEVICE, IN PARTICULAR FOR AN ELECTRIC VEHICLE

CROSS-REFERENCE TO RELATED APPLICATIONS

This application is the U.S. national phase of the International Patent Application No. PCT/EP2017/083375 filed Dec. 18, 2017, which claims the benefit of French Application No. 16 62747 filed Dec. 19, 2016, the entire content of which is incorporated herein by reference.

FIELD

The field of the disclosure relates to charging devices, in particular for electric vehicles.

BACKGROUND

With the growing size of the fleet of electric vehicles, the devices for charging these vehicles are intended to increase substantially in number. However, the use of these charging devices can have a high impact on the electrical grid to which they are connected, particularly the low-voltage portion of this grid because consumers connect to the electrical energy transmission network via this portion.

Typically, certain charging devices, especially those intended for installation in a residential area, are connected to an electricity point of delivery to which other electrical equipment items are connected, also pulling power from this point of delivery. This requires the charging devices to consider the power drain by the other equipment items during operation.

A conventional approach to regulating the electric power delivered by a charging device in order to charge a vehicle connected to it is to determine it as a function of the power drawn by the other equipment, and to regulate this power in real time based on measurements of the power drawn by the other equipment.

However, this approach has disadvantages. It is rigid as a whole, because it limits the phenomena that regulation can take into account. In addition, monitoring the power drawn by the other equipment and processing these data in real time in order to determine the regulated power supplied by the device are resource-intensive tasks, particularly in terms of the computing power involved.

The disclosure therefore aims to improve the situation.

SUMMARY

To this end, the disclosure relates to a charging device, in particular for an electric vehicle, the charging device being adapted to have its input connected to an electricity point of delivery adapted to provide a maximum electric power, the charging device being adapted to output regulated electric power for charging an electric vehicle with electrical energy, the charging device comprising:

an optimization module configured to construct a charging profile associated with a charging time slot and representative of a first charging power adapted to be delivered by the charging device during said charging time slot in order to charge the electric vehicle, the charging profile being constructed at least on the basis of power consumption predictions for other equipment items connected to said point of delivery for at least a portion of said charging time slot and on the basis of the maximum electric power, and a regulation module adapted to regulate the electric power that is output, the regulation module having:

a first mode of operation wherein it is configured to regulate the electric power that is output to match said electric power to the first charging power during at least a portion of the associated charging time slot, and a second mode of operation wherein it is configured to regulate the electric power that is output to match it to a second charging power determined at least on the basis of power consumption data for said other equipment items measured during said time slot and on the basis of the first charging power of the charging profile, the regulation module being adapted to switch between the first mode of operation and the second mode of operation.

According to an embodiment, the regulation module is configured to switch from the first mode of operation to the second mode of operation in response to the satisfying of at least one first condition in which at least one condition is associated with one or more time intervals in the charging time slot and is defined on the basis of power consumption predictions for the other equipment items for said time interval or intervals and on the basis of power consumption data for said other equipment items measured during the charging time slot.

According to an embodiment, the at least one condition is configured to be detected as satisfied in response to the fact that a quantity representative of the deviation between the power consumption prediction for the other equipment items and the consumption of said other equipment items as measured at the corresponding moments or indeed a consumption prediction for said other equipment items determined for the corresponding moments based on said power consumption data measured during the charging time slot is greater than a threshold value during the associated interval or intervals.

According to an embodiment, at least one first condition is defined on the basis of the comparison between the maximum electric power of the point of delivery and a quantity representative of a total electric power to be supplied by said point of delivery for the charging device and said other equipment items during said charging time slot, the quantity representative of a total electric power to be supplied by the point of delivery for the charging device and said other equipment items being constructed to correspond to a total electric power as estimated for at least one future time interval of the charging time slot.

According to an embodiment, the first condition defined on the basis of the comparison between the maximum electric power of the point of delivery and said quantity is constructed to be satisfied if the value of said quantity exceeds the maximum power for a predetermined number of future time intervals in the time slot, said predetermined number depending on the amplitude by which said quantity exceeds the maximum power.

According to an embodiment, the optimization module is adapted to update the charging profile for at least a remaining portion of said charging time slot on the basis of at least power consumption predictions for the other equipment items connected to said point of delivery for at least part of said remaining portion of the charging time slot, determined at least from power consumption data for said other equipment items measured during the charging time slot.

According to an embodiment, the optimization module is adapted to update the charging profile in response to the satisfying of a predetermined condition defined on the basis of a deviation between the electrical energy corresponding to the regulated electric power actually supplied to the electric vehicle during the charging time slot up to a given moment, and the electrical energy corresponding to the first electric power defined by the charging profile up to the given moment of the charging slot.

According to an embodiment, the regulation module is configured to switch from the second mode of operation to the first mode of operation in order to implement the charging profile in response to at least one second condition being satisfied, of which at least one condition is associated with one or more time intervals of the charging time slot and is defined on the basis of power consumption predictions for the other equipment items for said time interval or intervals and on the basis of power consumption data for said other equipment items measured during the charging time slot.

According to an embodiment, the at least one condition of the at least one second condition is configured to be detected as satisfied in response to the fact that a quantity representative of the deviation between the power consumption prediction for the other equipment items and the consumption of said other equipment items as measured at the corresponding moments or indeed a consumption prediction for said other equipment items determined for the corresponding moments based on said power consumption data measured during the charging time slot is less than a threshold value during the associated interval or intervals.

According to an embodiment, the charging profile is further constructed on the basis of at least one of the following:
a charging behavior of an electrical energy storage device of the electric vehicle,
an electrical energy requirement of the electrical energy storage device of the electric vehicle, for charging said electrical energy storage device,
an electricity pricing,
an electrotechnical behavior of electrical protection equipment of the point of delivery.

According to one aspect of the disclosure, the second charging power is further defined as a function of at least one of the following:
an electrotechnical behavior of electrical protection equipment at the point of delivery,
a charging constraint of the electric vehicle, representative of at least one range of electric power output values that is excluded or of a maximum number of times that charging is stopped during charging of the electric vehicle by the charging device during the charging time slot.

According to an embodiment, the charging profile is determined as an optimal solution to the problem of minimizing: the maximum value of the electric power drawn at the point of delivery by the charging device and the other equipment items for the charging time slot, the total cost of the electrical energy to be supplied by the point of delivery for the charging time slot, and the end of charging time for the electric vehicle.

According to an embodiment, the charging device further comprises a learning module configured to generate learning data from the operation of the charging device, at least the power consumption predictions for the other equipment items connected to said point of delivery for at least a portion of said charging time slot being constructed on the basis of said learning data.

The disclosure further relates to a method for charging an electric vehicle by means of a charging device whose input is connected to an electricity point of delivery adapted to provide the charging device with a maximum electric power and to output a regulated electric power for charging an electric vehicle with electrical energy, the method comprising:
constructing a charging profile associated with a charging time slot and representative of a first charging power adapted to be output during said charging time slot in order to charge the electric vehicle, the charging profile being constructed at least on the basis of power consumption predictions for the other equipment items connected to said point of delivery for at least a portion of said charging time slot and on the basis of the maximum electric power, and
implementing a first mode of operation of the charging device, wherein the charging device outputs electric power regulated to match the first charging power during at least a portion of the associated charging time slot.
switching from the first mode of operation to a second mode of operation wherein the charging device outputs electric power regulated to match a second charging power determined at least on the basis of power consumption data for said other equipment items measured during said time slot and on the basis of the first charging power of the charging profile.

The disclosure further relates to a computer program comprising instructions for implementing the method as defined above when executed by a processor.

BRIEF DESCRIPTION OF THE DRAWINGS

The disclosure will be better understood by reading the following detailed description, given solely as an example and with reference to the appended figures, in which.

DETAILED DESCRIPTION

Figure 1:
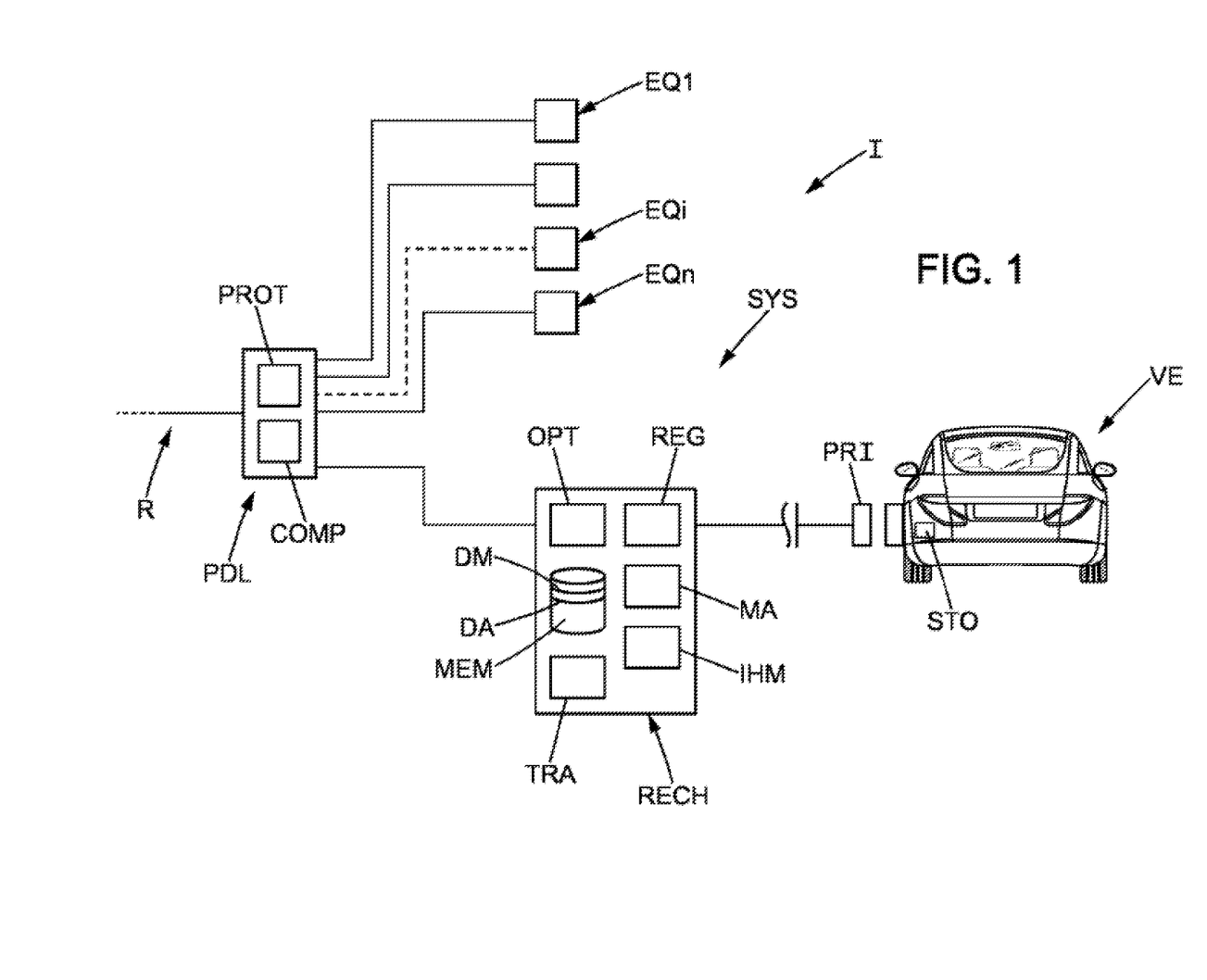
FIG. 1 is a schematic illustration of a system comprising a charging device according to an embodiment.

FIG. 1 illustrates a system SYS in the sense of an embodiment.

The system SYS is intended for charging an electric vehicle VE with electrical energy, the vehicle propulsion being based wholly or in part on electrical energy.

The system SYS comprises a point of delivery PDL, at least one equipment item EQi connected to the point of delivery PDL, and a charging device RECH according to the disclosure, hereinafter the device RECH.

The equipment EQi and the charging device RECH are part of a facility I. This facility corresponds for example to a place of residence. For example, the equipment items EQi are installed at least partially inside a home. The charging device is for example arranged outside.

Alternatively, this facility is some other type of location such as a place of commerce or a business. The facility comprises, for example, a parking lot with the charging device arranged within it or at the edges.

In general, the disclosure can be applied regardless of the system I. Preferably, the equipment items EQi and the charging device constitute the set of elements capable of drawing electrical energy at the point of delivery. In other words, only the equipment items EQi and the charging device RECH are able to extract electrical energy at the point of delivery PDL.

The system SYS, and more specifically the point of delivery PDL, is connected to an electric power grid R for its supply of electrical energy. This grid R is itself connected to one or more power generation facilities, the power traveling via the grid R to the point of delivery PDL.

In the context of the disclosure, the device RECH is intended to be connected to the vehicle VE in order to charge it with electrical energy.

For this purpose, the vehicle VE comprises a storage device STO for storing electrical energy and for supplying it to at least one propulsion unit of the vehicle VE which propels the vehicle at least by means of electrical energy.

The point of delivery PDL is provided for supplying electrical energy to the equipment items EQi and to the device RECH.

In practice, the point of delivery PDL corresponds to the node between the grid R and the facility I to which the equipment items EQi and the device RECH belong. It comprises for example one or more electrical equipment items configured to establish this connection.

For example, the point of delivery PDL comprises a metering device COMP for measuring the electrical energy/electric power drawn at the point of delivery by the equipment items EQi and the device RECH.

The metering device COMP is configured to measure at least the electric power and electrical energy drawn by these elements over time. Advantageously, it is adapted to categorize the electrical energy drawn into types of use and to measure the consumption for each of these uses. These uses each correspond to a type of activity among a predetermined set.

For example, for a residential facility I, these uses include heating the facility I, cooling the facility I, producing domestic hot water, lighting the facility I, a cooking use which corresponds to using electrical energy for cooking, a washing use which corresponds to using electrical energy for washing, so-called "brown goods" use which corresponds to using electrical energy to operate household appliances such as televisions, etc.

Note that this categorization into types of use is optional.

In addition, the metering device is configured to communicate with the charging device, in particular in order to supply data representative of the consumption, for example of power, by the equipment items EQi and collected by it over time. Note that the data communicated at a given moment are relative to a moment immediately preceding this moment, and/or relating to more distant moments.

It also advantageously comprises a protection device PROT configured to protect the electrical facility defined by the equipment items and the device RECH and the elements connecting them to the point of delivery. This protection device PROT advantageously comprises a cutoff device. Note that this cutoff device may be hardware, comprising for example a circuit breaker, and/or software.

In some embodiments, the protection device PROT may be an integral part of the metering device COMP, at least in part.

In the context of the disclosure, the point of delivery PDL is configured to deliver a maximum electric power, denoted Pmax. This maximum power is for example determined as a function of the power draw subscribed to with a supplier for the point of delivery. This power Pmax is for example less than or equal to 36 kVA.

The equipment items EQi are configured to at least partially operate using electrical energy.

These equipment items EQi correspond for example to conventional equipment in a residence, such as radiators, lighting, household appliances, an oven, stove burners, a water heater, etc. Another possible type of equipment relates to servers, for example data servers.

As mentioned above, these equipment items are all connected to the point of delivery.

The charging device RECH according to the disclosure is specifically provided in order to charge the electric vehicle VE with electrical energy using the electrical energy it draws at the point of delivery.

In addition, it is configured to communicate with the point of delivery, in particular the metering device, and to communicate with the electric vehicle. These communications are for example implemented by any known means, such as the Internet, ZigBee, WiFi, or a wired means, for example a means based for example on powerline communication (PLC) technology. The device RECH comprises a plug or socket PRI, a memory MEM, and a processing module TRA. In addition, it comprises an optimization module OPT, a regulation module REG, and a learning module MA. Advantageously, it further comprises a human-machine interface, hereinafter the interface IHM.

The plug or socket PRI is intended to be connected to the electric vehicle VE in order to connect it electrically to the charging device, to charge the electric vehicle. For this purpose, the vehicle itself comprises a socket or plug of complementary shape intended to engage with the plug or socket PRI.

The plug or socket PRI is for example of known style. It is for example in the form of a socket, the vehicle carrying the plug.

The memory MEM comprises programs whose execution by the processing module TRA enables the charging device to operate.

Advantageously, it further comprises learning data DA described below.

In addition, it advantageously comprises measurement data DM. These measurement data are representative of the measurements, in particular of electric power, drawn by the equipment items EQi over time. During the time slot PTr, these data define a power curve CONSO (FIG. 2B) representative of the electric power drawn by the equipment items EQi at the point of delivery over time.

These data are constructed from the consumption data generated by the metering device and sent to the device RECH, for example at a regular frequency. These data include, for example, the charging curve of the point of delivery excluding consumption due to charging the electric vehicle.

Note that the memory MEM may correspond to a plurality of separate storage memories, such as for example one or more volatile memories and/or one or more non-volatile memories. The various data are for example distributed between these separate memories.

The processing module TRA is configured to control the various elements of the charging device RECH so that they operate properly. The processing module TRA comprises for example one or more processors.

In the example of FIG. 1, the optimization module OPT, the regulation module REG, and the learning module MA have been represented as dedicated modules. In practice, they may take any form. In particular, they may be software, hardware, or comprise a software component and a hardware component.

For example, the optimization module OPT comprises a software component stored in memory and whose execution by the processing module results in implementing the functionalities described below.

The same is true for the regulation and learning modules. The regulation module advantageously comprises a hardware regulation device, comprising for example one or more converters configured to output regulated electric power.

Figure 2A:
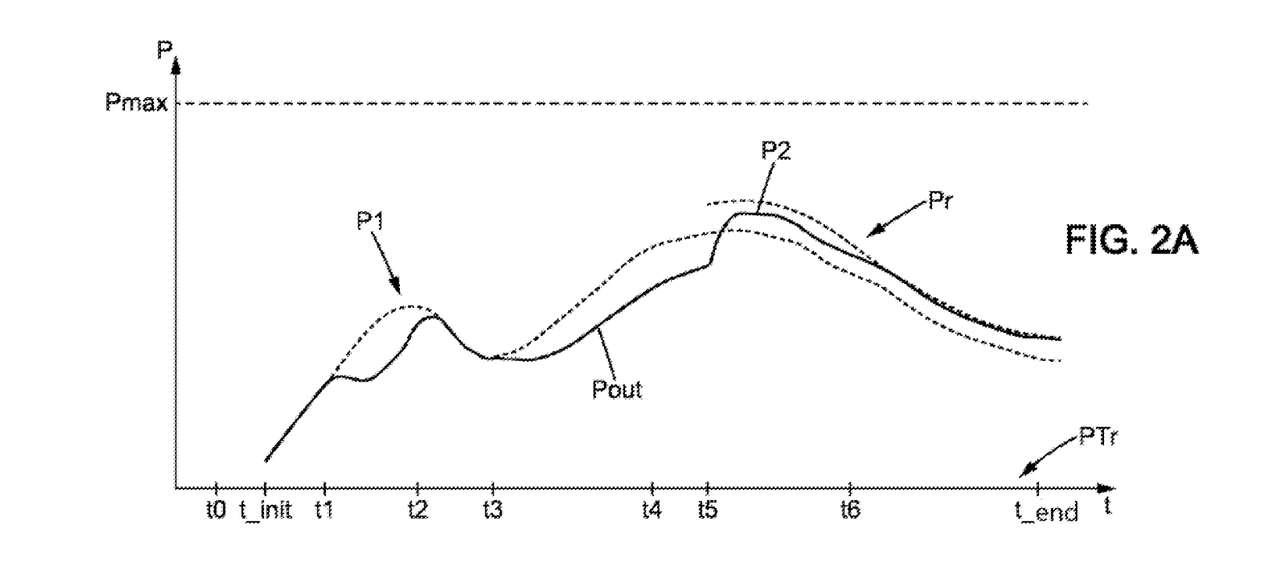
FIGS. 2A and 2B are a schematic illustration of the quantities considered during a charging time slot.
Figure 2B:
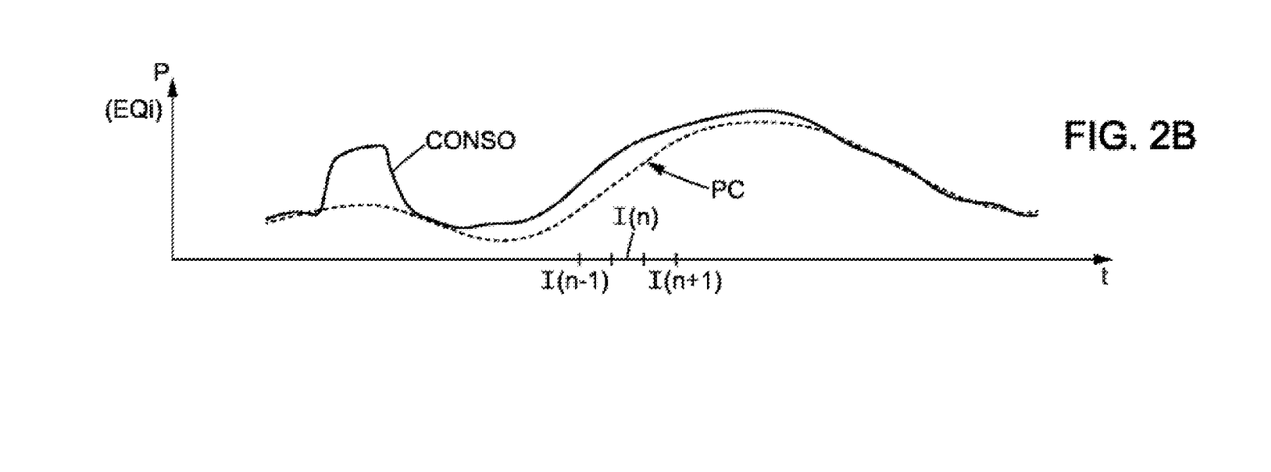

With reference to FIGS. 1 and 2, the optimization module OPT is configured to construct a charging profile Pr associated with a charging time slot PTr. The charging profile Pr is representative of a first charging power P1, or first power P1, adapted to be output from the device RECH to the vehicle VE during the charging slot PTr in order to charge the vehicle. In other words, at a given moment, the charging profile is defined by the power P1 at that moment, this power P1 usually varying over time.

The charging profile Pr defines this power for at least a portion of the charging slot. Advantageously, it defines this power P1 for each moment within the slot PTr.

The slot PTr corresponds to the time slot during which the electric vehicle is charged. This slot starts at moment t_init and ends at moment t_end.

The moment t_init is for example defined according to the moment the vehicle VE is connected to the charging device. For example, it corresponds to this moment. Advantageously, it is later than this moment. More specifically, it advantageously corresponds to the moment when the charging device begins to send electrical energy to the vehicle in order to charge it. The time interval between plugging in the vehicle and this moment is for example used to implement an initial step of charging device preparation, described below, during which the charging profile Pr is constructed. Note that this preparation may also be implemented, or at least begin, at the moment the vehicle is plugged in, for example when the vehicle is supposed to provide information concerning its electrical energy requirements to the charging device from a distance.

The moment t_end corresponds to the moment when the charging of the vehicle VE is considered complete. In practice, from that moment on, electric power is no longer supplied to the vehicle for charging, and this is true until it is disconnected from the plug or socket PRI.

Moment t_end is for example known prior to moment t_init. In this case, moment t_end is, for example, predetermined on the basis of information received by the charging device RECH. This information comes for example from the vehicle VE itself, or is entered by a user, for example via the interface IHM.

Alternatively, this moment is determined, for example by the optimization module OPT. Indeed, this moment is for example an element in the result of the process of constructing the charging profile.

The charging slot PTr is for example subdivided into consecutive intervals taken into account in the operation of the charging device RECH (intervals denoted I(n−1), I(n), I(n+1) in FIG. 2B). These intervals are for example regular (in other words all having the same duration), their duration being for example about a second. Alternatively, these intervals are not all of the same duration. For example, in a first mode of operation of the device, they have a regular duration, for example an order of magnitude of about a minute. In a second mode, they are for example also regular, with a duration for example of about a second. These modes of operation are described below.

The charging profile Pr is constructed at least on the basis of the power consumption predictions PC for the equipment items EQi adapted to draw electricity at the point of delivery PDL. These predictions cover at least a portion of the slot PTr, and advantageously the entire slot PTr.

For example, the predictions taken into account cover the same portion of the charging slot as the portion for which the charging profile Pr defines the power P1, the value of the power P1 at a given moment being determined at least on the basis of the consumption prediction for the equipment items EQi for this moment.

The consumption predictions are established before the start of the charging time slot PTr.

These predictions advantageously correspond to the predicted cumulative consumption for the different equipment items EQi, and thus define the expected behavior of the only elements likely to draw electrical energy at the point of delivery aside from the device RECH during the charging of the electric vehicle VE.

For example, these predictions are in the form of electric power varying over time.

These predictions are for example determined in a known manner, for example from a GAM model, which is the acronym for "Generalized Additive Model". For example, they are based on the measurement data DM, which define a consumption history of the equipment items EQi. Advantageously, they are more specifically established from measurement data corresponding to time blocks covering those of the charging time slot PTr. For example, these predictions are based on predictions for each type of use associated with the point of delivery PDL. These predictions by type of use are, for example, determined from the measurement data DM, which can represent consumption of the different types of use of the equipment items EQi over time.

Advantageously, the predictions made at a given moment are determined at least on the basis of the measurement data DM for the consumption of equipment items EQi relating to a lapse of time immediately preceding that moment. In other words, the most recent consumption data are taken into account for constructing predictions.

The charging profile Pr is also determined on the basis of the maximum power Pmax that the point of delivery can deliver.

Advantageously, in other words optionally but in an advantageous manner, the charging profile Pr is further determined as a function of at least one of the following:

a charging behavior of the storage device STO of the electric vehicle, the electrical energy requirement of the storage device STO of the electric vehicle, in order to charge it, pricing for the electrical energy supplied by the point of delivery PDL in order to charge the vehicle, the electrotechnical behavior of device PROT of the point of delivery PDL, a power capacity of the charging device RECH, in other words a maximum power that the charging device RECH is designed to deliver.

The charging behavior of device STO is representative of the charging operation of the storage device. This behavior comprises, for example, considerations relating to one or more constraints concerning the electric power received, such as its value relative to a lower bound to be exceeded and/or an upper bound not to be exceeded, or to variations in power over time that are not to be exceeded. This behavior may alternatively or in parallel include a consideration relating to the number of times that charging is observed to be stopped during the period PTr, which is for example to be kept below a predetermined value.

In practice, this charging behavior of the device STO is representative of the charging characteristics of the storage device STO that it is preferable to observe in order to avoid damaging it.

The energy requirement of the storage device STO corresponds to a charge state of the storage device prescribed for the vehicle's autonomy requirements. This requirement is for example related to the amount of electrical energy stored in the device STO when it is connected to the device RECH, as well as the desired amount of electrical energy at the end of charging. Note that the final charge state does not necessarily correspond to a complete recharge of the storage device STO.

This desired amount of electrical energy at the end of charging is for example provided to the device RECH, for example by the user via the interface IHM or the vehicle VE. Alternatively, it is estimated, for example by the optimization module or by any other equipment of the charging device RECH, such as a dedicated module. This estimate is for example constructed from the usage data of the vehicle. These usage data are for example provided by the vehicle to the device RECH, which stores them in memory MEM. For example, these data include a history of trips made with the vehicle. This history comprises or is for example determined from GNSS positioning data ("Global Navigation Satellite System") representative of the locations of the vehicle over time, and which the device RECH obtains from the vehicle VE.

In practice, the electrical energy requirement of the charging device is for example in the form of a charge state to be reached at the end of the time slot PTr.

The electricity pricing is representative of the cost of the electrical energy drawn or to be drawn at the point of delivery in order to charge the electric vehicle. In other words, it is the price of charging the vehicle with electricity, which device RECH is intended to perform. In a known manner, this price (i.e. the tariff) is determined from the unit cost associated with a unit of electricity measurement, typically one kilowatt-hour (kWh). However, in a known manner, the cost of this unit of electricity measurement, for example expressed in euros per kilowatt-hour, may differ from one time slot to another.

For example, this pricing is determined from data stored in the memory which include time-of-use pricing indices, adapted to be matched with price data for example provided by a remote device. One will note that these pricing indices can be updated, for example regularly or when triggered by external equipment.

The electrotechnical behavior of the protection device PROT is representative of the operation of the device according to the power drawn at the point of delivery PDL, and in particular according to the conditions for switching between a state where it allows energy to be drawn at the point of delivery by the charging device and the equipment items EQi, and a state where it prevents this, in particular in order to protect the facility I.

For example, the protection device PROT may be configured to allow exceeding the maximum power Pmax for a short period of time, but switches to a state that no longer allows the drawing of energy beyond this time. Note that the period of time in question is for example predetermined on the basis of the amplitude by which Pmax is exceeded.

In practice, this behavior models the response of the protection device to events involving the safety of the electrical component of the facility I.

Advantageously, the optimization module OPT is configured to determine the charging profile Pr as an optimal solution of an optimization problem with at least one objective and at least one constraint.

The term "objective" means the quantity to be minimized in the optimization problem. "Constraint" means a condition to be satisfied by the solution to the problem. For example, the objective(s) are chosen among: the cost (price) associated with charging the electric vehicle, the maximum value of the electric power drawn at the point of delivery while charging the vehicle (in other words the highest value reached by the cumulative power required to supply the equipment items and to charge the vehicle by the device RECH during the period PTr), completion of the charging as soon as possible.

Advantageously, these three objectives are taken into account, the charging profile then being constructed as an optimal solution to a problem of minimizing: the maximum value of the electric power drawn at the point of delivery by the charging device and the other equipment items for the charging time slot, a total cost of the electrical energy to be provided by the point of delivery for the charging time slot, and the end of charging time.

In general, the constraint or constraints are advantageously chosen from: the maximum power Pmax, as exceeding this is to be prevented; the electrical energy requirement of the vehicle, which dictates the total amount of energy supplied to the vehicle during the slot PTr; and the charging behavior of the storage device STO, which aims to prevent a charging of the device STO that is likely to damage it.

One will note that exceeding the power Pmax can be authorized when such an overrun occurs under conditions that do not switch the protection device PROT to its configuration that disallows drawing from the point of delivery.

The details of constructing the charging profile Pr are based for example on a multi-criteria approach.

For example, associated with the problem is a metric defined from several sub-metrics respectively associated with one of the objectives. Each sub-metric is weighted by a factor of chosen form. The metric is for example defined as a combination, for example linear, of different sub-metrics.

Each sub-metric has for example a value corresponding to the associated objective, for example the pricing, the end of charging time, the value of the maximum power reached during the time slot.

The charging profile is determined from the data of the problem modeled in this manner, for example by the resolution technique of integer linear programming (ILP).

Alternatively, a hierarchical method (sometimes known as the epsilon-constraint method) may be used, in which each sub-metric is considered sequentially.

Note that the charging profile Pr has for example a continuous piecewise configuration. For example, the profile defines a single value for the power P1 for each time interval concerned, which is constant throughout this interval. Advantageously, the optimization module OPT is adapted to update the charging profile Pr. It is for example adapted to do so during the slot PTr, the update concerning at least part of the remaining portion of the time slot, and advantageously all this remaining portion.

For example, to do this, it is configured to update the data used to construct the initial charging profile, and to determine the updated profile from these updated data.

In particular, it is configured to update the consumption predictions, for example from the measurement data DM received since the beginning of the slot PTr. Advantageously, when the electrical energy requirement of the vehicle is used, it is configured to update these, for example taking into account a partial satisfaction of this requirement via the electrical energy already supplied to the vehicle VE during the slot PTr.

This update is for example implemented on command, for example a command received from the regulation module.

Alternatively, the optimization module OPT itself triggers this update. Advantageously, this update is implemented in response to detecting that one or more of the conditions described below have been satisfied.

Still referring to FIGS. 1 and 2, the regulation module REG is configured to regulate the electric power actually supplied by the device RECH to the vehicle VE during the period PTr. This power is denoted Pout.

This power Pout is variable over time.

The regulation module REG comprises a first mode of operation in which it is configured to regulate the power Pout to match it to the power P1 of the charging profile Pr.

In other words, in this first mode of operation, the regulation module provides a regulated electric power linked to the power P1 determined by the optimization module, which is then the power prescribed for the output from the charging device RECH.

In addition, the regulation module REG comprises a second mode of operation in which it is configured to regulate the power Pout to match it to a second prescribed power P2.

This power P2 is determined on the basis of the maximum electric power Pmax. In addition, it is determined on the basis of the measurement data DM supplied by the metering device COMP to the device RECH concerning the electric power drawn by the equipment items EQi, and more specifically from the data defining the power curve CONSO for the power drawn by the equipment items EQi.

Advantageously, these data are processed by the regulation module REG in order to form a short-term prediction of the power that the equipment items EQi are expected to withdraw at the point of delivery PDL. For example, "short-term" means that this prediction relates to the expected consumption for some or all of all future intervals within at least a predetermined numbers of intervals of the current interval, for example about 10 intervals. This horizon is for example 10, 20, or even 30 intervals. In other words, this prediction is for one or more future intervals distanced by less than s intervals from the current interval. The predictions advantageously relate to a set of consecutive intervals, such as for example the 5, 10, or 15 intervals after the current interval, or following an interval which itself is a future interval within the horizon considered.

The details of determining these predictions are for example known.

The second power P2 is further determined as a function of power P1, in other words of the charging profile determined by the optimization module.

Advantageously, the second power P2 is further determined from at least one of the following:

the electrotechnical behavior of the protection device PROT of the point of delivery PDL, a charging constraint of the electric vehicle, representative of at least one range of electric power values Pout which is excluded, a maximum number of times that the charging of the electric vehicle can be stopped by the charging device RECH during the charging time slot, in other words occurrences of situations in which P2 is zero.

An element that can also be taken into account is the power capacity of the charging device RECH, in other words a maximum power that the charging device RECH is designed to deliver.

As before, the electrotechnical behavior of device PROT is representative of its response to events occurring in the electrical component of the facility and at the point of delivery, in particular total power draws at the point of delivery PDL exceeding the power Pmax.

In practice, this behavior is taken into account in the form of a model, for example defined by one or more rules. One of these rules concerns for example the fact that exceeding the power Pmax can be allowed to occur but then cannot exceed a certain value and must not remain true for more than a predetermined duration. For example, these rules come in the form of one or more nomograms.

Thus, for example, the power P2 is constructed according to this or these rules, of which at least one incorporates one or more conditions relating to exceeding Pmax.

Alternatively, it should be noted that the consideration of Pmax can be implemented as an upper limit of the power P2 that must not be exceeded, even for a very short time.

As previously indicated, the exclusion of ranges of values of Pout and the maximum number of times that charging is stopped constitute conditions relating to the charging of the vehicle under conditions that do not result in damage to it.

Advantageously, the power P2 is constructed as a sum of the power P1 (at the corresponding moments) and a regulation quantity (which can take negative values) representative of an adjustment to the power P1 from its initial value.

In practice, since the value of P1 is known, the processing performed to determine P2 essentially concerns this regulation quantity.

For example, the approach used to determine this regulation quantity for the different intervals is based on a heuristic approach.

For example, in the context of this approach, for a given time interval, the value of the regulation quantity is chosen from a plurality of discrete values respectively associated with a state of the system SYS among several possible states.

The values in question may for example be determined at least from P1.

The state of the system is determined from the elements considered (the consumption predictions, Pmax, and/or the behavior of device PROT, etc.). The elements selected are for example successively analyzed, each element resulting in the selection of one or more values among a plurality of possible values, in order to ultimately select a single value. For example, the analysis of at least one element is adapted to result in selecting a single value for the regulation quantity, at least for the last element analyzed. Elements other than the last one can lead to the selection of a single value, thereby interrupting the element analysis sequence.

Note that for a given element, the possible values from which the selected value or values are chosen are for example defined on the basis of the result from the analysis of the preceding criterion. In other words, the second criterion analyzed can lead to retaining different possible values (from which the selection is subsequently made) depending on the result of the analysis of the previous criterion.

For example, in the case of short-term predictions, if it is determined for a time interval that the deviation between Pmax and the consumption predictions is less than a threshold value, the retained value for the regulation quantity is chosen so that the power P2 is zero or minimal.

Note that some values may be excluded over time, for example following their selection a predetermined number of times during or during a portion of past time intervals.

The regulation module REG is configured to switch between the first mode of operation and the second mode of operation. In other words, the module REG can switch between these modes in both directions.

Switching from the first mode to the second mode advantageously occurs in response to at least one first condition being satisfied.

Advantageously, at least one of these first conditions is defined on the basis of the comparison between the maximum electric power Pmax and a quantity representative of a total electric power to be supplied by said point of delivery for the charging device and for said other equipment items during said charging time slot.

In other words, this quantity is defined from the total power requested or likely to be requested by the equipment items EQi and the charging device during one or more time intervals of the time slot PTr.

The quantity has a given value during a given interval. In other words, it represents the electric power drawn or intended to be drawn by the device RECH and the equipment items for each moment in this interval.

The quantity considered is for example associated with a past time interval. In this configuration, the quantity is constructed from consumption measurement data DM for the equipment items, as well as the history of the supplied power Pout (which is for example stored in memory during operation of the charging device RECH). Alternatively, the value (or values) of P2 for the interval considered is taken into account.

Alternatively, the quantity considered is associated with a future interval. In this configuration, the quantity is constructed from consumption predictions for the equipment items EQi, for example those generated by the optimization module OPT or by the regulation module REG. In addition, the electric power associated with the device RECH corresponds to the value of P1 provided by the charging profile for that moment.

In practice, the quantity is for example constructed to correspond to the sum of the consumption of the equipment items EQi (predicted or actual) and of the charging device (respectively predicted, actual) for the associated interval.

The comparison corresponds for example to a difference between Pmax and the cumulative power consumption by the equipment items EQi and the charging device RECH. Advantageously, the condition is constructed from the value of this quantity for different consecutive intervals. In addition, it is constructed so that it is satisfied if the value of this quantity exceeds the maximum power Pmax for a predetermined number of consecutive intervals. In other words, the condition is detected as satisfied if it is satisfied for a selected number of consecutive intervals.

Advantageously, the intervals in question are future intervals, so that the device RECH thus evaluates the future state of the point of delivery PDL and anticipates potentially problematic events.

This number is advantageously predetermined based on the operation of the protection device PROT, and corresponds to or approaches for example the maximum amount of time that it can tolerate exceeding Pmax without stopping the drawing of power at the point of delivery.

Alternatively, this number is equal to one (only one interval then being considered).

Advantageously, at least one first condition is defined from the consumption of the equipment items as predicted by the optimization module for the construction of the charging profile, for at least one time interval, and from a quantity that is a function of the consumption of the equipment items EQi as measured, in other words the power provided by the curve CONSO.

The interval(s) considered are future and/or past intervals.

For each past interval, the quantity corresponds directly to the consumption (i.e. the electric power) of the equipment as measured for the interval considered. Thus, for this interval, the consumption prediction for the equipment items EQi and their consumption as measured are taken into account.

For each future interval, the quantity is also a prediction of the consumption of the equipment items EQi for this interval. This prediction is for example constructed at least from recent measurement data DM, for example relating to one or more intervals separated from the interval considered by a predetermined maximum duration (which for example is expressed by taking into account the last i data received from the point of delivery PDL relating to the consumption of the equipment items EQi). The procedures for this first prediction are for example those implemented in the second mode of operation, and correspond to short-term predictions.

Advantageously, the condition targets the deviation between the consumption predicted by the optimization module and the consumption as measured or predicted from more recent consumption data.

Advantageously, the condition is constructed to be satisfied if a quantity representative of the observed deviation is greater than a threshold value for a predetermined number of consecutive intervals (for example greater than or equal to 1) associated with this condition.

In practice, the analyzed quantity (which optionally corresponds to an absolute value) may correspond to the conventional difference. However, other methods of calculation may be envisaged; difference is only one possible exemplary operation.

Note that this condition may be taken as the only condition for the switch. Alternatively, it is used in conjunction with another condition such as the one above.

The regulation module REG is advantageously configured to switch from the second mode of operation to the first mode of operation—in which context it regulates the power Pout to implement the charging profile—in response to at least one second condition being satisfied. Advantageously, at least one of these conditions is defined on the basis of the comparison between the maximum electric power of the point of delivery and a second quantity representative of a total electric power to be supplied by the point of delivery for the charging device and said other equipment items.

This second quantity is for example identical to the quantity used for the switch from the first mode of operation to the second mode of operation (the considered values of this quantity being in principle associated with other intervals).

The second condition is for example constructed so as to be satisfied if the difference between the power Pmax and the value of this second quantity is less than a predetermined value during one or more intervals. Preferably, the intervals considered are future intervals.

Alternatively or in parallel, the or a second condition taken into account is defined on the basis of the consumption of the equipment items EQi as measured, in other words the power supplied by the curve CONSO, and the consumption of the equipment items as predicted by the optimization module for the construction of the charging profile, for at least one time interval.

For example, this condition is close to the one employed as the first condition. For example it is identical, except that it is considered to be satisfied when the quantity representative of the deviation between the prediction PC and the measured consumption (for past intervals) or the prediction constructed from measurements (for future intervals) is less than a predetermined threshold value over the interval or intervals selected for this condition. This threshold value may be different from that used in the first condition. The second condition may also differ in the number of intervals taken into account.

Still with reference to FIG. 1, the learning module MA is configured to generate the learning data DA. These data are advantageously used in the context of the operation of the optimization module OPT, and/or the operation of the regulation module REG.

Advantageously, the learning data DA comprise prediction learning data.

These prediction learning data are intended to improve the predictions made by the optimization module and/or the regulation module on the basis of the operation of the charging device RECH over time. These data are for example generated from statistical data concerning the modes of operation of the regulation module, the switching between these modes, the delivered power Pout, the charging requirement data collected from the vehicle, the connection times of the vehicle, and/or the consumption predictions previously made.

Advantageously, these data include prediction parameterization data used for the determination of consumption predictions determined by the charging device RECH in general, regardless of the prediction method used, for example a GAM type method, an expert aggregation method, or a Deep Learning type of learning method.

Advantageously, the learning data also comprise optimization learning data intended to refine the procedures for determining the charging profile Pr over time from the data used.

These data advantageously include resolution parameterization data, which for example include values for the weighting factors for submetrics used in constructing the charging profile. These values are adjusted over time. As above, these adjustments are advantageously carried out on the basis of data collected during the operation of the charging device RECH.

The learning data advantageously include regulation learning data configured to refine the operation of the regulation module, in particular the second mode of operation, over time.

These data include, for example, regulation parameterization data defining one or more rules relating to determining the regulation quantity. These regulation parameterization data affect, for example, the values resulting from the analysis of some or all of the selected elements, the order of analysis of the selected elements, and/or the nature of the selected elements.

As before, these data are advantageously constructed on the basis of data collected during operation of the device RECH.

The learning data are for example constructed by the learning module on the basis of learning rules that define the configuration of the learning module.

These learning rules are based, for example, on a method for evaluating the decisions made by the components of the charging device RECH (in particular the modules OPT and REG). The evaluation of a decision, for example such as the construction of a given charging profile or the determination of a value for the regulation quantity, is based for example on the comparison between this decision and at least one simulation of this decision made with one or more other elements of the decision being modified (for example, for the determination of the regulation quantity, the nature of an element selected for the determination of P2, the order of the elements, and/or the values selected for the analysis of each element). This comparison is configured to result in an evaluation of the decision made, for example via one or more quantified indicators, and an adjustment of the learning data according to the evaluations made.

In practice, these learning rules define the manner in which the different learning data are generated from information concerning the operation of the charging device RECH, collected over time, and advantageously the nature and the form of the data from the operation of the charging device RECH which are used to generate learning data via learning rules. As indicated above, these learning data are optionally used by the regulation module and the optimization module to carry out their functions. When this is so, they are used for the resolution techniques implemented and/or the techniques for constructing the input data for this resolution. Alternatively, when this is not so, the modules OPT and REG use other values, for example predetermined ones. One will note that modifications can be made to these predetermined values, for example in the form of updates during which the charging devices RECH are updated, for example on site by an operator or remotely.

The interface IHM comprises for example a display and/or one or more input buttons (possibly combined with the display in the form of a touchscreen display). This interface is intended for data entry by the user, as well as for displaying information intended for the user, such as information relating to charging the vehicle, in particular the end of charging time, the corresponding charge state, etc.

Figure 3:
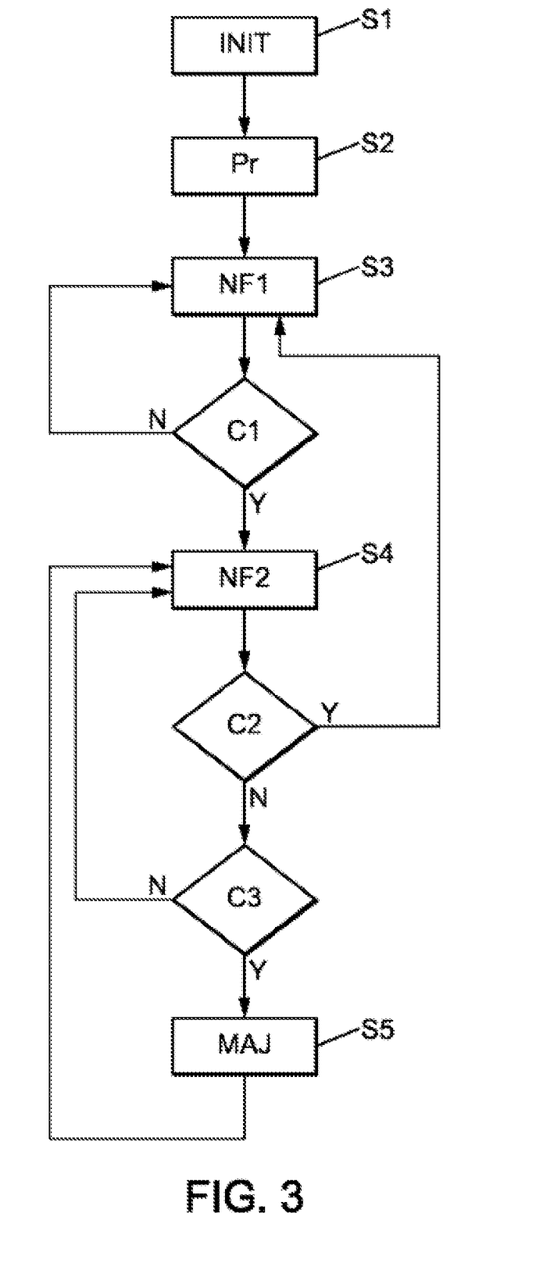
FIG. 3 is a block diagram of a charging method according to an embodiment.

The operation of the charging device will now be described with reference to the figures, in particular to FIGS. 2 and 3.

During an initial step S1, the vehicle VE is connected to the charging device RECH (time t0).

In response, the optimization module OPT constructs the charging profile Pr during a step S2. Note that this step S2 may also occur before the vehicle is connected to the charging device.

To do this, it proceeds as indicated above. In particular, it constructs the time slot PTr, in particular its start and end time. In addition, it constructs the consumption predictions PC for the equipment items EQi over the time slot PTr. This construction takes into account the measurement data DM, and advantageously also the learning data DA. The charging profile Pr is then determined from these predictions PC and from Pmax, and optionally other considered elements.

Once the charging profile Pr has been constructed, during a step S3 beginning with the charging time slot (t_init), the charging device starts the actual charging of the vehicle VE. For this purpose, the regulation module REG is initiated in its first mode of operation, and delivers power Pout regulated to correspond to the power P1. In practice, to a given moment there then corresponds a power Pout regulated to correspond to the power P1 of the charging profile constructed for that moment.

In parallel, the charging device RECH, in particular for example the regulation module REG, watches for the satisfying of the first condition(s) for switching the regulation module to the second mode of operation. In practice, for the current interval (or for each predetermined interval, for example at a regular frequency), the first conditions are analyzed. If they are detected as not being satisfied, the first mode of operation is maintained during the next interval.

If the first conditions are detected as satisfied, in a step S4 the regulation module REG switches to the second mode of operation, which is then for example implemented beginning with the next interval (time t1). This is for example the case when the actual consumption of the equipment items EQi diverges sufficiently from the consumption that was predicted for the construction of the charging profile Pr.

During this step S4, the regulation module regulates the power Pout so that it corresponds to the power P2.

In parallel, it determines whether the second condition or conditions for switching to the first mode of operation mode are met. This is for example checked regularly, for example at each time interval.

If such is the case, the control module switches back to the first mode of operation (time t2). In FIG. 2A, this first mode is again implemented until time t3, where the control module returns to the second mode of operation.

If such is not the case, it determines whether the condition or conditions for updating the charging profile are all met (this occurs for example at time t4).

For example, one of these conditions is defined on the basis of a deviation between the electrical energy actually supplied to the electric vehicle during the charging time slot up to a given moment, and the electrical energy corresponding to the electric power provided in the charging time slot up to the given moment as defined by the charging profile Pr before updating.

In other words, this condition relates to a comparison between the total electrical energy actually supplied to the vehicle by the charging device during the time slot PTr (in other words a summation over time of Pout up to the moment considered) and the total energy that the vehicle would have received during the time slot PTr if the charging profile had been applied for the entire elapsed portion of the time slot PTr (a summation over time of P1 up to the moment considered).

If this deviation, which is for example in the form of a difference, is greater than a predetermined threshold, the optimization module is ordered to update the charging profile. Advantageously, these conditions are tested at each new interval, at least until they have been satisfied.

Advantageously, once these conditions are satisfied and the update has been carried out, the analysis of the conditions is discontinued for a predetermined period of time, corresponding for example to a predetermined number of intervals.

It should be noted that one condition that can be used concerns a change in the pricing indices used by the optimization module for determining the electricity pricing.

For example, if a quantity quantifying a divergence between the old indices and the new indices is greater than a chosen threshold value, the optimization module is called in order to update the charging profile.

This condition may be used alone or in combination with at least one other.

As shown in FIG. 2A, this update results in replacing the predicted values of P1 for future intervals with new values, which are taken into account in place of the initial values for these intervals as of that moment (t5).

At the end of this update, the implementation of the second mode of operation continues, the power P2 being determined from then on from the updated charging profile and not from the initial profile (or in general from the previous profile used).

As before, the monitoring of the first conditions continues, as well as those for updating the charging profile, the corresponding responses being handled accordingly.

In FIG. 2A, the device switches to the first mode of operation at time t6, this mode remaining implemented until time t_end.

The disclosure has several advantages.

First, it has a more flexible operation than known approaches, particularly because it allows switching between modes of operation based on different considerations. One consideration is determined at a given moment and does not require further calculation, and the other acts as a compensation mechanism for a divergence between the upstream prediction of the system's evolution and its real-time state.

In addition, the device can operate in many different ways, so that it is easily adaptable to the conditions of use, in particular the equipment items EQi, the nature of the facility, etc.

In addition, it is evolving, as it makes adjustments to its operation by learning from the data it collects.

It should be noted that the deviations mentioned in the above description are, for example, absolute value deviations.

It should be noted that the predictions for the requirements of the optimization module and/or of the regulation module can in practice be constructed by a dedicated prediction module. This module communicates the appropriate predictions to the corresponding module, for example on request.

One should also note that the profile Pr can be constructed by using a population of candidate solutions having sub-metric values determined for each of them, thereby providing a value for the metric. A selection is then made among the candidate solutions on the basis of the respective values for the metrics of these solutions. For example, each candidate solution corresponds to a given consumption prediction, and/or to given values for the weighting factors.

It should be noted that the analysis of whether the condition or conditions for triggering the update of the charging profile have been met is advantageously independent of the mode of operation currently in use. In particular, these conditions can be tested in the first mode of operation.

The invention claimed is:

1. A charging device, in particular for an electric vehicle, the charging device being adapted to have its input connected to an electricity point of delivery adapted to provide a maximum electric power, the charging device being adapted to output regulated electric power for charging an electric vehicle with electrical energy, the charging device comprising:

an optimization module configured to construct a charging profile associated with a charging time slot and representative of a first charging power adapted to be delivered by the charging device during said charging time slot in order to charge the electric vehicle, the charging profile being constructed at least on the basis of power consumption predictions for other equipment items connected to said point of delivery for at least a portion of said charging time slot and on the basis of the maximum electric power, and a regulation module adapted to regulate the electric power that is output, the regulation module having:
a first mode of operation wherein it is configured to regulate the electric power that is output to match said electric power to the first charging power during at least a portion of the associated charging time slot, and
a second mode of operation wherein it is configured to regulate the electric power that is output to match it to a second charging power determined at least on the basis of power consumption data for said other equipment items measured during said time slot and on the basis of the first charging power of the charging profile, the regulation module being adapted to switch between the first mode of operation and the second mode of operation.

2. The charging device according to claim 1, wherein the regulation module is configured to switch from the first mode of operation to the second mode of operation in response to the satisfying of at least one first condition in which at least one condition is associated with one or more time intervals in the charging time slot and is defined on the basis of power consumption predictions for the other equipment items for said time interval or intervals and on the basis of power consumption data for said other equipment items measured during the charging time slot.

3. The charging device according to claim 2, wherein the at least one condition is configured to be detected as satisfied in response to the fact that a quantity representative of the deviation between the power consumption prediction for the other equipment items and the consumption of said other equipment items as measured at the corresponding moments or indeed a consumption prediction for said other equipment items determined for the corresponding moments based on said power consumption data measured during the charging time slot is greater than a threshold value during the associated interval or intervals.

4. The charging device according to claim 2, wherein at least one first condition is defined on the basis of the comparison between the maximum electric power of the point of delivery and a quantity representative of a total electric power to be provided by said point of delivery for the charging device and said other equipment items during said charging time slot, the quantity representative of a total electric power to be supplied by the point of delivery for the charging device and said other equipment items being constructed to correspond to a total electric power as estimated for at least one future time interval of the charging time slot.

5. The charging device according to claim 4, wherein the first condition defined on the basis of the comparison between the maximum electric power of the point of delivery and said quantity is constructed to be satisfied if the value of said quantity exceeds the maximum power for a predetermined number of future time intervals in the time slot, said predetermined number depending on the amplitude by which said quantity exceeds the maximum power.

6. The charging device according to claim 1, wherein the optimization module is adapted to update the charging profile for at least a remaining portion of said charging time slot on the basis of at least power consumption predictions for the other equipment items connected to said point of delivery for at least part of said remaining portion of the charging time slot, determined at least from power consumption data for said other equipment items measured during the charging time slot.

7. The charging device according to claim 6, wherein the optimization module is adapted to update the charging profile in response to the satisfying of a predetermined condition defined on the basis of a deviation between the electrical energy corresponding to the regulated electric power actually supplied to the electric vehicle during the charging time slot up to a given moment, and the electrical energy corresponding to the first electric power defined by the charging profile up to the given moment of the charging slot.

8. The charging device according to claim 1, wherein the regulation module is configured to switch from the second mode of operation to the first mode of operation in order to implement the charging profile in response to at least one second condition being satisfied, of which at least one condition is associated with one or more time intervals of the charging time slot and is defined on the basis of power consumption predictions for the other equipment items for said time interval or intervals and on the basis of power consumption data for said other equipment items measured during the charging time slot.

9. The charging device according to claim 8, wherein the at least one condition of the at least one second condition is configured to be detected as satisfied in response to the fact that a quantity representative of the deviation between the power consumption prediction for the other equipment items and the consumption of said other equipment items as measured at the corresponding moments or indeed a consumption prediction for said other equipment items determined for the corresponding moments based on said power consumption data measured during the charging time slot is less than a threshold value during the associated interval or intervals.

10. The charging device according to claim 1, wherein the charging profile is further constructed on the basis of at least one of the following:
a charging behavior of an electrical energy storage device of the electric vehicle,
an electrical energy requirement of the electrical energy storage device of the electric vehicle, for charging said electrical energy storage device,
an electricity pricing,
an electrotechnical behavior of electrical protection equipment of the point of delivery.

11. The charging device according to claim 1, wherein the second charging power is further defined as a function of at least one of the following:
an electrotechnical behavior of electrical protection equipment at the point of delivery,
a charging constraint of the electric vehicle, representative of at least one range of electric power output values that is excluded or of a maximum number of times that charging is stopped during charging of the electric vehicle by the charging device during the charging time slot.

12. The charging device according to claim 1, wherein the charging profile is determined as an optimal solution to the problem of minimizing: the maximum value of the electric power drawn at the point of delivery by the charging device and the other equipment items for the charging time slot, the total cost of the electrical energy to be supplied by the point of delivery for the charging time slot, and an end of charging time for the electric vehicle.

13. The charging device according to claim 1, further comprising a learning module configured to generate learning data from the operation of the charging device, at least the power consumption predictions for the other equipment items connected to said point of delivery for at least a portion of said charging time slot being constructed on the basis of said learning data.

14. A method for charging an electric vehicle by means of a charging device whose input is connected to an electricity point of delivery adapted to provide the charging device with a maximum electric power and to output a regulated electric power charging an electric vehicle with electrical energy, the method comprising:
constructing a charging profile associated with a charging time slot and representative of a first charging power adapted to be output during said charging time slot in order to charge the electric vehicle, the charging profile being constructed at least on the basis of power consumption predictions for the other equipment items connected to said point of delivery for at least a portion of said charging time slot and on the basis of the maximum electric power, implementing a first mode of operation of the charging device, wherein the charging device outputs electric power regulated to match the first charging power during at least a portion of the associated charging time slot, and switching from the first mode of operation to a second mode of operation wherein the charging device outputs electric power regulated to match a second charging power determined at least on the basis of power consumption data for said other equipment items measured during said time slot and on the basis of the first charging power of the charging profile.

15. A non-transitory computer-readable medium having stored thereon computer-executable instructions for implementing the method according to claim 14 when executed by a processor.

\* \* \* \* \*